US012577140B2

(12) United States Patent
Biland

(10) Patent No.: US 12,577,140 B2
(45) Date of Patent: Mar. 17, 2026

(54) VERTICAL MELTING FURNACE FOR IGNEOUS ROCK FIBER MANUFACTURING

(71) Applicant: Rock Fiber, Inc., Houston, TX (US)

(72) Inventor: Oleksandr Biland, The Woodlands, TX (US)

(73) Assignee: Rock Fiber, Inc., Houston, TX (US)

( * ) Notice: Subject to any disclaimer, the term of this patent is extended or adjusted under 35 U.S.C. 154(b) by 148 days.

(21) Appl. No.: 18/528,182

(22) Filed: Dec. 4, 2023

(65) Prior Publication Data

US 2024/0182346 A1      Jun. 6, 2024

Related U.S. Application Data

(60) Provisional application No. 63/430,515, filed on Dec. 6, 2022.

(51) Int. Cl.
| | |
|---|---|
| *C03B 5/02* | (2006.01) |
| *C03B 37/02* | (2006.01) |
| *C03B 37/083* | (2006.01) |

(52) U.S. Cl.
CPC .......... *C03B 5/021* (2013.01); *C03B 37/0203* (2013.01); *C03B 37/083* (2013.01)

(58) Field of Classification Search
CPC ................................ C03B 5/021; C03C 13/06
See application file for complete search history.

(56) References Cited

U.S. PATENT DOCUMENTS

| | | | |
|---|---|---|---|
| 6,647,747 | B1 | 11/2003 | Brik |
| 9,771,294 | B1 | 9/2017 | Zubko et al. |
| 10,696,576 | B2 | 6/2020 | Prabhu et al. |
| 10,858,275 | B2 | 12/2020 | Biland et al. |
| 2004/0056026 | A1 | 3/2004 | Jakes et al. |
| 2017/0022082 | A1* | 1/2017 | Prabhu .................... C03B 37/02 |
| 2017/0240450 | A1 | 8/2017 | Meng et al. |
| 2020/0392031 | A1 | 12/2020 | Zubko et al. |
| 2021/0053856 | A1* | 2/2021 | Biland ...................... C03B 7/07 |

* cited by examiner

*Primary Examiner* — Erin Snelting
(74) *Attorney, Agent, or Firm* — Neo IP

(57) ABSTRACT

The present invention is directed to a vertical volcanic rock melting furnace having a reduced spatial footprint relative to prior art furnaces. The melting furnace includes a top melting section, which raises the temperature of a charge above the liquidus temperature, a middle cooling section configured to reduce the temperature of the melt, and a bottom conditioning section configured to maintain the melt above a crystallization temperature before the melt is distributed to one or more bushing plates to extrude into fibers. The top melting section and the bottom conditioning sections are surrounding by induction coils for inductively raising the temperature of the melt.

16 Claims, 10 Drawing Sheets

VERTICAL MELTING FURNACE FOR IGNEOUS ROCK FIBER MANUFACTURING

CROSS REFERENCES TO RELATED APPLICATIONS

This application claims priority to and the benefit of U.S. Provisional Patent Application No. 63/430,515, filed Dec. 6, 2022, which is incorporated herein by reference in its entirety.

BACKGROUND OF THE INVENTION

1. Field of the Invention

The present invention relates to melting furnaces for producing igneous rock fibers, and more specifically to vertical furnaces adapted to producing igneous rock fibers.

2. Description of the Prior Art

It is generally known in the prior art to provide melting furnaces for producing igneous rock fibers.

Prior art patent documents include the following:

U.S. Pat. No. 10,696,576 for Basalt processing via electric induction heating and melting by inventors Prabhu et al., filed Jul. 24, 2016 and issued Jun. 30, 2020, discloses an electric induction system and method for induction heating and melting of basalt charge for the production of molten process basalt that can be used for molten basalt processes that produce basalt articles of manufacture including cast basalt articles and continuous basalt casting processes for producing basalt articles such as fibers and filaments.

U.S. Pat. No. 9,771,294 for Basalt fibers produced from high temperature melt by inventors Zubko et al., filed Apr. 21, 2016 and issued Sep. 26, 2017, discloses methods, systems and apparatus for producing continuous basalt fibers, microfibers, and microspheres from high temperature melts. A cold crucible induction furnace is used to super heat crushed basalt rock to form a melt. The melt is cooled prior to forming a fiber. The fiber produced from the superheated melt possesses superior properties not found with conventional basalt fibers produced in gas furnaces. In some implementations, the superheated melt is spun into continuous basalt fibers. In some implementations, the superheated melt is blown into microfibers and microspheres.

US Patent Publication No. 2020/0392031 for Basalt fibers produced from high temperature melt by inventors Zubko et al., filed Mar. 24, 2020 and published Dec. 17, 2020, discloses methods, systems and apparatus for producing continuous basalt fibers, microfibers, and microspheres from high temperature melts. A cold crucible induction furnace is used to super heat crushed basalt rock to form a melt. The melt is cooled prior to forming a fiber. The fiber produced from the superheated melt possesses superior properties not found with conventional basalt fibers produced in gas furnaces. In some implementations, the superheated melt is spun into continuous basalt fibers. In some implementations, the superheated melt is blown into microfibers and microspheres.

U.S. Pat. No. 10,858,275 for Apparatus and process for producing fiber from igneous rock by inventors Biland et al., filed Jun. 15, 2017 and issued Dec. 8, 2020, discloses methods and apparatus for producing fibers from igneous rock, including basalt include heating igneous rock by electrical conductive coils to achieve an homogenous melt and forming homogenous fibers from the melt.

US Patent Publication No. 2017/0240450 for Induction melter for glass melting and systems and methods for controlling induction-based melters by inventors Meng et al., filed Aug. 21, 2015 and published Aug. 24, 2017, discloses systems and methods for heating and melting glass through the use of induction based heating and methods for forming a fiberglass strand. An exemplary induction melter system for melting glass can include a melting vessel and a heated drain. The melting vessel can include a crucible, a first induction coil positioned around at least a portion of the crucible, and a first electromagnetic current generator coupled to the first induction coil. The heated drain can be coupled to the melting vessel, and the heated drain can include a drain tube, a second induction coil positioned around at least a portion of the drain tube, and a second electromagnetic current generator coupled to the second induction coil.

U.S. Pat. No. 6,647,747 for Multifunctional apparatus for manufacturing mineral basalt fibers by inventor Brik, filed Oct. 10, 2000 and issued Nov. 18, 2003, discloses a multifunctional apparatus and method to manufacture mineral (basalt) fibers to be drawn/attenuated into a continuous strand made from natural rock basalts with and without supplemental minerals. More specifically this invention discloses apparatus designed to manufacture a high quality continuous amorphous mineral (basalt) fibers with flexible/ductile properties from 7 μm to 100 μm in diameter without traces of crystalline phases which are suitable for a variety of industrial applications. The key members of apparatus are designed to provide a sequence of operations such as: mineral (basalt) rock melting in fore-chambers or retorts; volatile elements degasing and glass body mixing caused by glass body turbulence when flowing through the multi-zone sloped and in special configurations through horizontal valleys toward the collector; glass body homogenization at the collector-glass body receiver; additional glass body overheating inside upper chamber of two-chamber ceramic bushing utilizing either external induction or internal cathode-anode heating which is provided to decompose the stable complex oxides of minerals; glass body viscosity adjustment at the lower chamber of bushing and fiber formation beneath discharge wall containing orificed ceramic plates. A heat transfer water cooled fin shields conduit consisting a wall made from refractory TiNi which is a water vapor permeable porous material allowing the manufacture of amorphous fibers to be drawn/attenuated at a suitable moisture environment.

SUMMARY OF THE INVENTION

The present invention relates to melting furnaces for producing igneous rock fibers, and more specifically to vertical furnaces adapted to producing basalt fibers.

It is an object of this invention to provide a furnace able to evenly heat large volumes of molten volcanic rock, such as basalt and andesite for higher productivity relative to existing furnaces.

In one embodiment, the present invention is directed to a furnace for melting igneous rock material, including a central melting body having a melting zone oriented vertically above a conditioning zone, at least one distribution channel extending outwardly from the conditioning zone of the central melting body, and at least one temperature sensor positioned in the bottom of the central melting body, wherein the melting zone of the central melting body is surrounded by at least one melting zone induction coil, wherein the at least one melting zone induction coil is operable to melt an igneous rock charge within the melting zone, wherein the conditioning zone is surrounded by at least one conditioning zone induction coil, wherein the at least one conditioning zone induction coil operates at a greater frequency than the at least one melting zone induction coil, wherein the at least one temperature sensor is configured to detect a temperature of melted igneous rock exiting the conditioning zone and entering the at least one distribution channel, and wherein a frequency and/or power used to operate the at least one melting zone induction coil and/or at least one conditioning zone induction coil are altered by a controller based on sensor data from the at least one temperature sensor.

In another embodiment, the present invention is directed to a method for manufacturing igneous rock fibers, including inserting an igneous rock charge into a melting zone of a furnace, wherein the melting zone is surrounded by at least one melting zone induction coil, the at least one melting zone induction coil, operating at a first frequency, melting the igneous rock charge in the melting zone, the melted igneous rock flowing into a conditioning zone of the furnace due to gravitational force, wherein the conditioning zone is surrounded by at least one conditioning zone induction coil, the at least one conditioning zone induction coil, operating at a second frequency, maintaining the melted igneous rock at approximately a preset temperature in the conditioning zone, the melted igneous rock flowing into at least one distribution channel; and a bushing plate, attached to the at least one distribution channel, extruding the melted igneous rock through a plurality of pores to create a plurality of charge fibers, wherein the first frequency is less than the second frequency.

In yet another embodiment, the present invention is directed to a furnace for melting igneous rock material, including a central melting body having a melting zone oriented vertically above a cooling zone, which is oriented vertically above a conditioning zone, at least one melting zone induction coil surrounding the melting zone of the central melting body, operable to melt an igneous rock charge deposited in the melting zone, at least one conditioning zone induction coil surrounding the conditioning zone of the central melting body, at least one distribution channel extending outwardly from the conditioning zone of the central melting body, at least one bushing plate connected to the at least one distribution channel, and at least one temperature sensor positioned in the bottom of the central melting body, a first temperature sensor positioned within a melt overflow channel of the melting zone, wherein first temperature sensor is operable to detect a temperature of melted igneous rock in the melting zone, and a second temperature sensor positioned between the conditioning zone and the at least one distribution channel, wherein the cooling zone includes an internal water-cooling jacket, and wherein the at least one distribution channel is oriented orthogonally to a central axis of the vertically arranged body.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART

4

Figure 3:
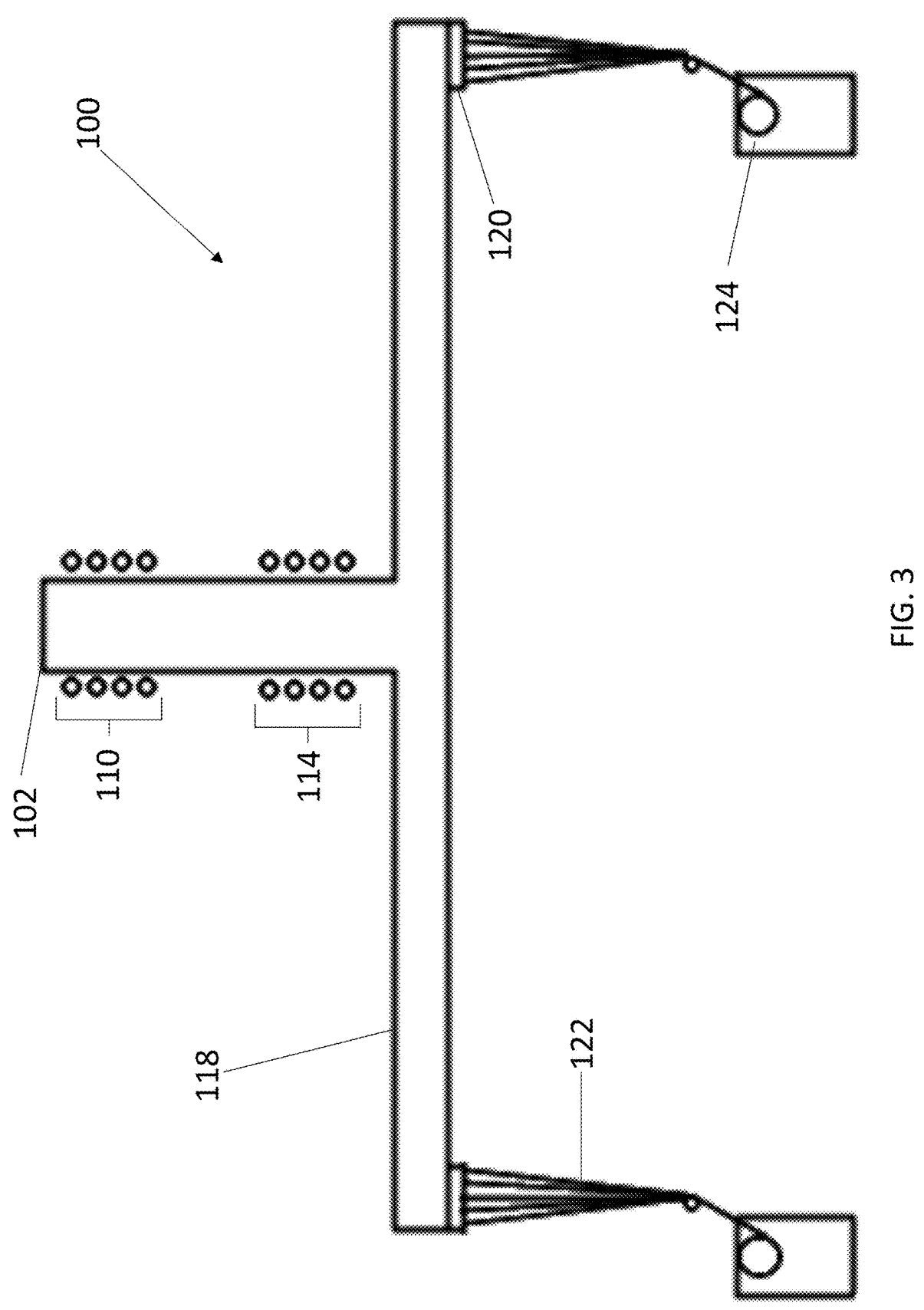
Figure 4:
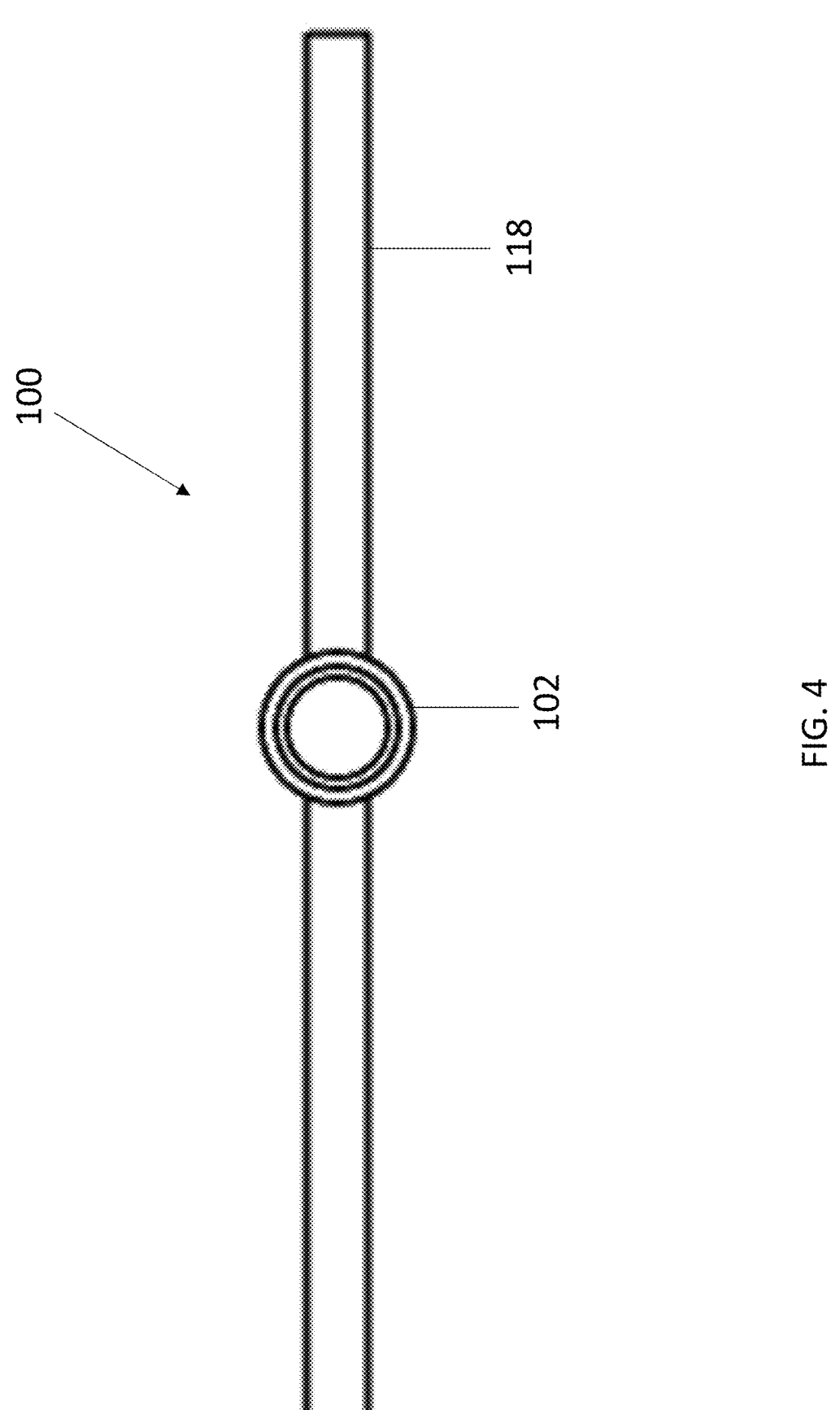
Figure 5:
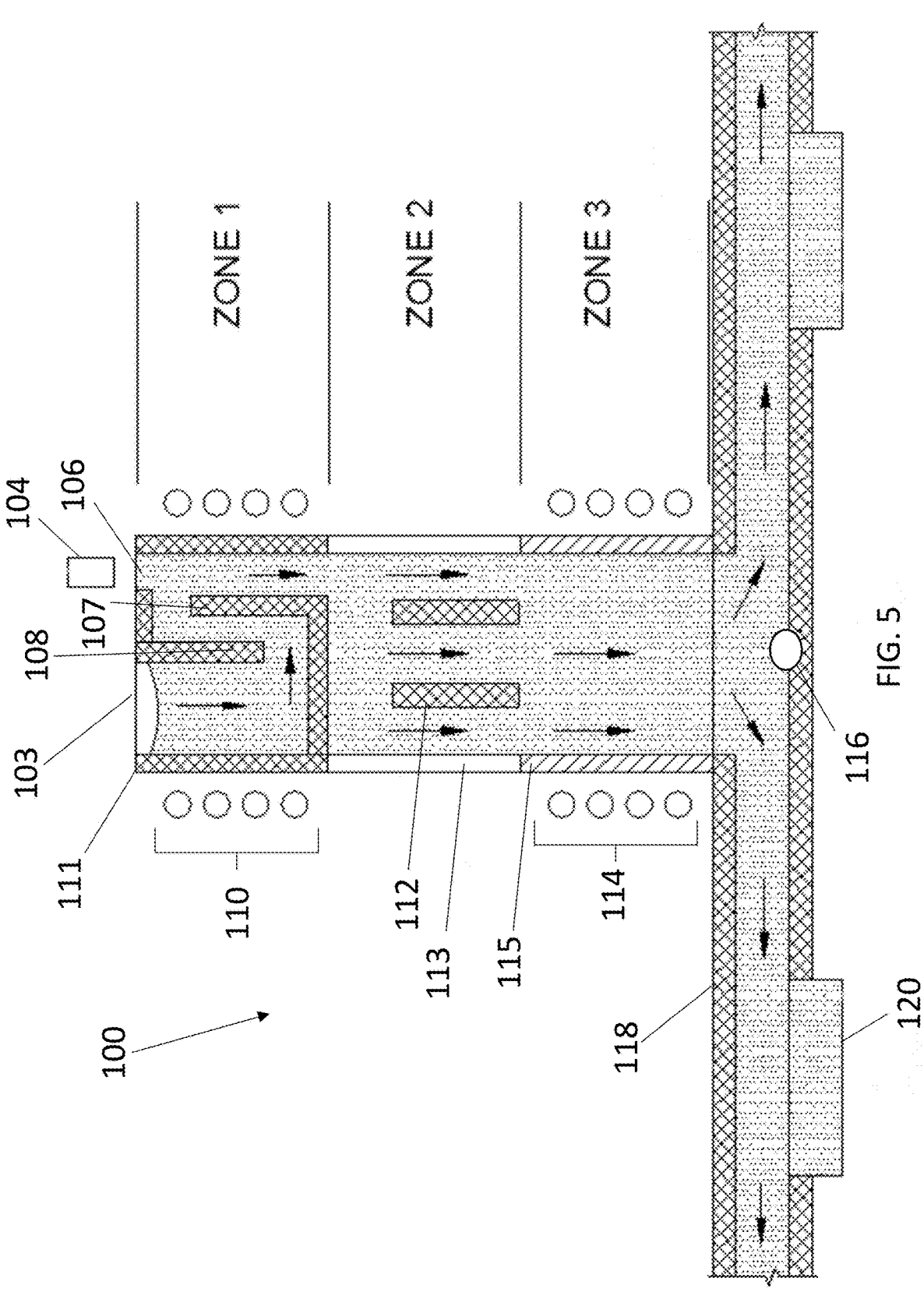
Figure 6:
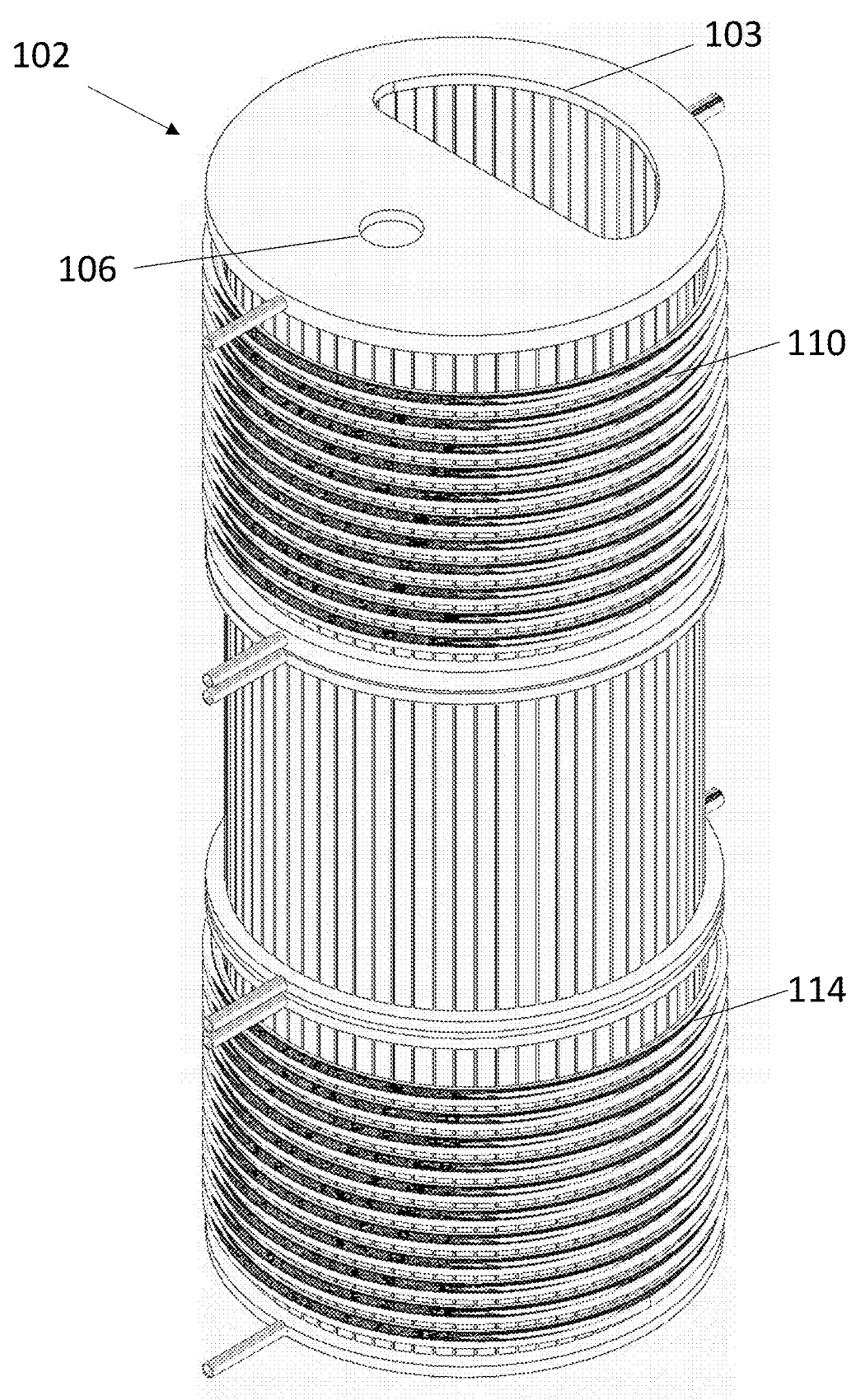
Figure 7:
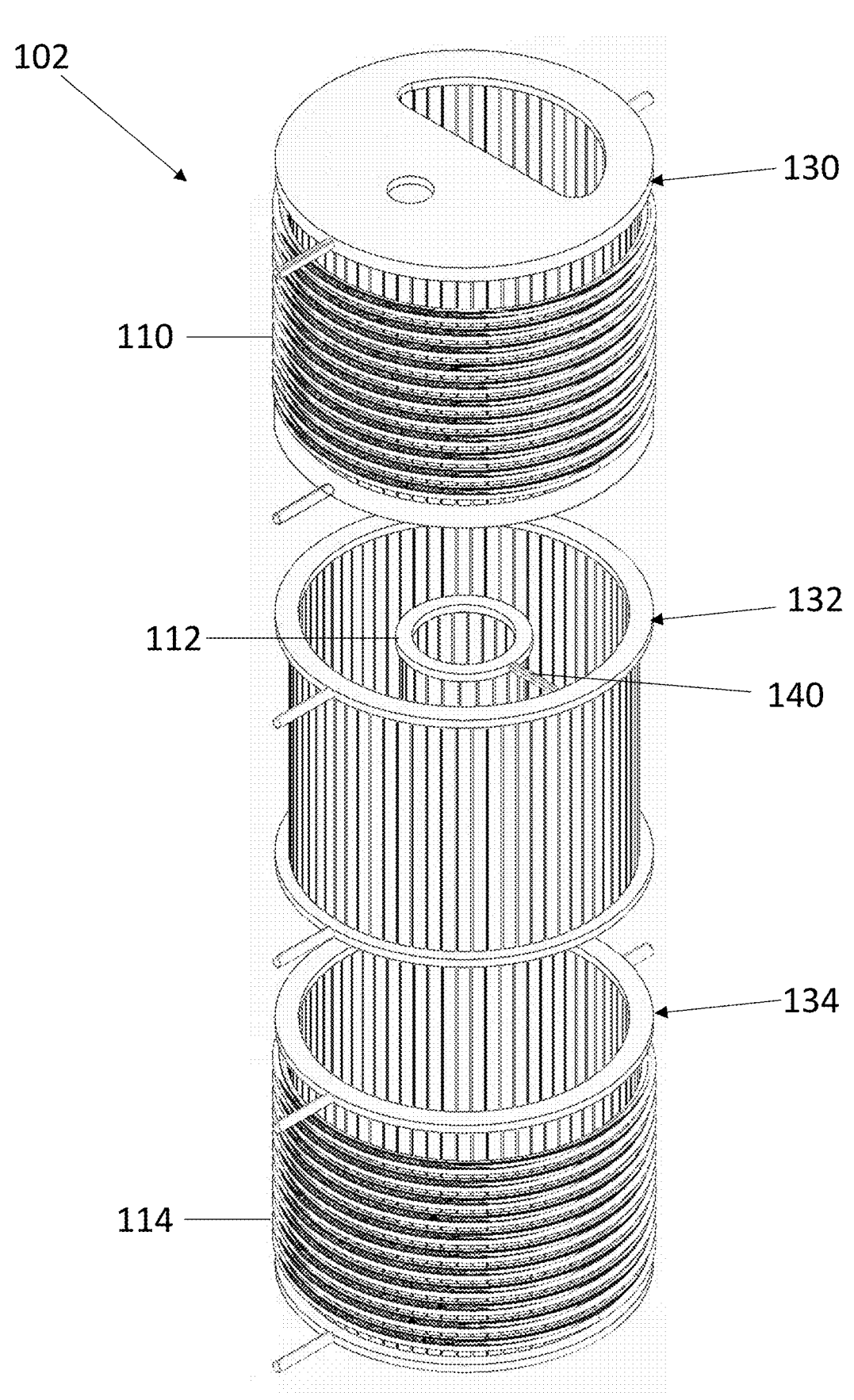
Figure 8:
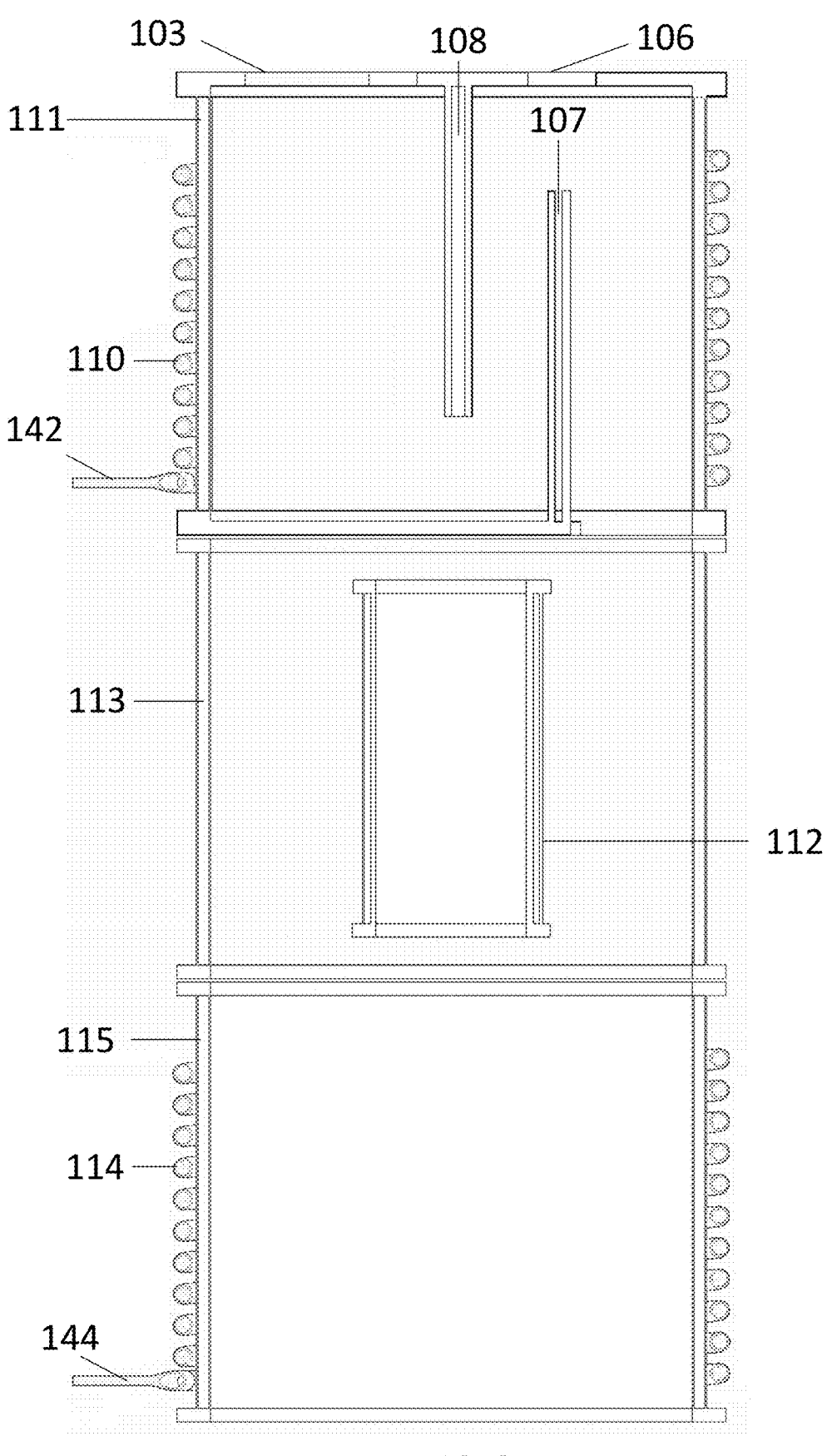
Figure 9:
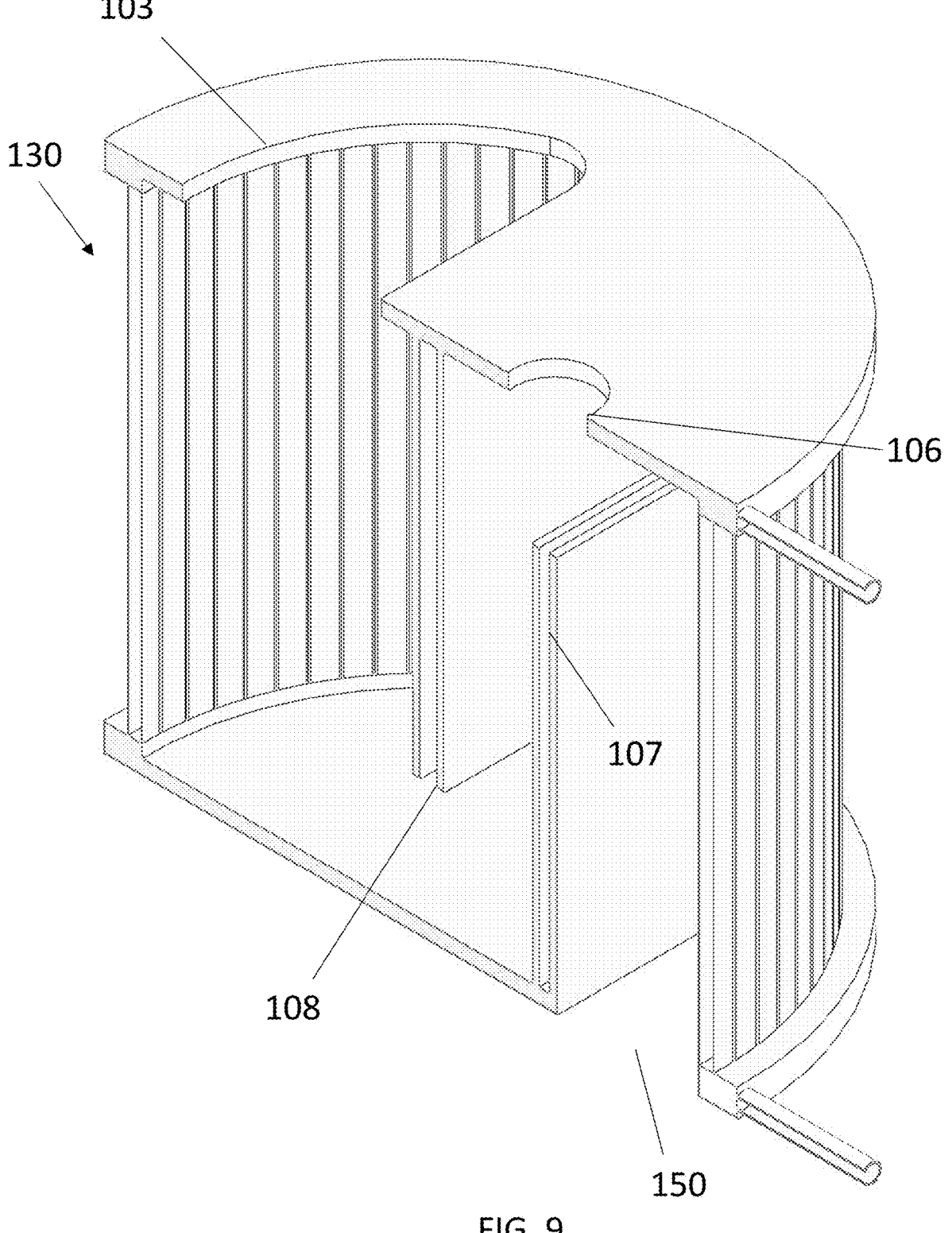
Figure 10:
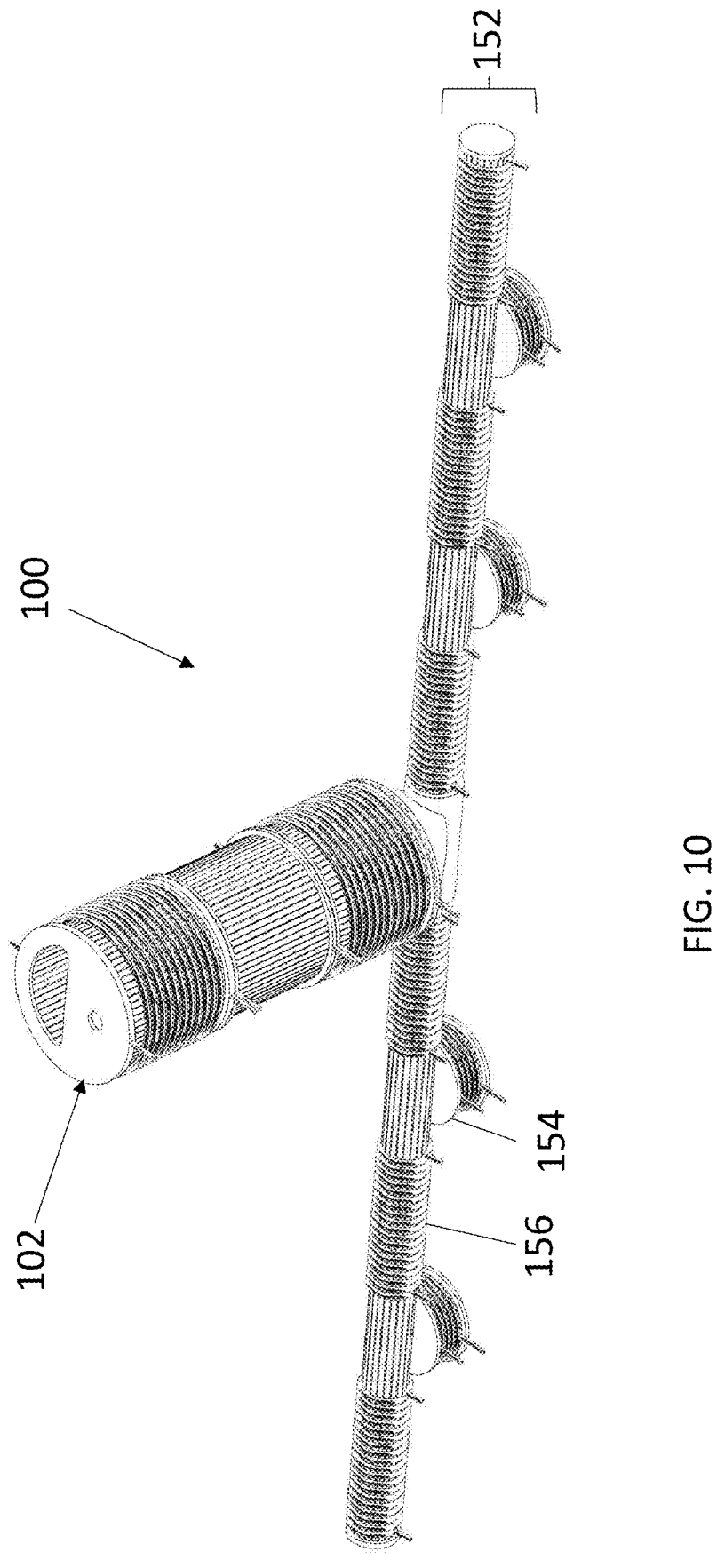

FIG. 3 illustrates a side view diagram of a cold crucible induction furnace according to one embodiment of the present invention.
FIG. 4 illustrates a top view diagram of a cold crucible induction furnace according to one embodiment of the present invention.
FIG. 5 illustrates a side sectional view diagram of a vertical furnace according to the present invention.
FIG. 6 illustrates a perspective view of an induction furnace according to one embodiment of the present invention.
FIG. 7 illustrates an exploded view of the induction furnace of FIG. 6.
FIG. 8 illustrates a side sectional view of the induction furnace of FIG. 6.
FIG. 9 illustrates a perspective sectional view of a melting section of an induction furnace according to one embodiment of the present invention.
FIG. 10 illustrates an induction furnace including a fore-hearth and bushing plates according to one embodiment of the present invention.

DETAILED DESCRIPTION

The present invention is generally directed to melting furnaces for producing igneous rock fibers, and more specifically to vertical furnaces adapted to producing basalt fibers.

In one embodiment, the present invention is directed to a furnace for melting igneous rock material, including a central melting body having a melting zone oriented vertically above a conditioning zone, at least one distribution channel extending outwardly from the conditioning zone of the central melting body, and at least one temperature sensor positioned in the bottom of the central melting body, wherein the melting zone of the central melting body is surrounded by at least one melting zone induction coil, wherein the at least one melting zone induction coil is operable to melt an igneous rock charge within the melting zone, wherein the conditioning zone is surrounded by at least one conditioning zone induction coil, wherein the at least one conditioning zone induction coil operates at a greater frequency than the at least one melting zone induction coil, wherein the at least one temperature sensor is configured to detect a temperature of melted igneous rock exiting the conditioning zone and entering the at least one distribution channel, and wherein a frequency and/or power used to operate the at least one melting zone induction coil and/or at least one conditioning zone induction coil are altered by a controller based on sensor data from the at least one temperature sensor.

In another embodiment, the present invention is directed to a method for manufacturing igneous rock fibers, including inserting an igneous rock charge into a melting zone of a furnace, wherein the melting zone is surrounded by at least one melting zone induction coil, the at least one melting zone induction coil, operating at a first frequency, melting the igneous rock charge in the melting zone, the melted igneous rock flowing into a conditioning zone of the furnace due to gravitational force, wherein the conditioning zone is surrounded by at least one conditioning zone induction coil, the at least one conditioning zone induction coil, operating at a second frequency, maintaining the melted igneous rock at approximately a preset temperature in the conditioning zone, the melted igneous rock flowing into at least one distribution channel; and a bushing plate, attached to the at least one distribution channel, extruding the melted igneous rock through a plurality of pores to create a plurality of charge fibers, wherein the first frequency is less than the second frequency.

In yet another embodiment, the present invention is directed to a furnace for melting igneous rock material, including a central melting body having a melting zone oriented vertically above a cooling zone, which is oriented vertically above a conditioning zone, at least one melting zone induction coil surrounding the melting zone of the central melting body, operable to melt an igneous rock charge deposited in the melting zone, at least one conditioning zone induction coil surrounding the conditioning zone of the central melting body, at least one distribution channel extending outwardly from the conditioning zone of the central melting body, at least one bushing plate connected to the at least one distribution channel, and at least one temperature sensor positioned in the bottom of the central melting body, a first temperature sensor positioned within a melt overflow channel of the melting zone, wherein first temperature sensor is operable to detect a temperature of melted igneous rock in the melting zone, and a second temperature sensor positioned between the conditioning zone and the at least one distribution channel, wherein the cooling zone includes an internal water-cooling jacket, and wherein the at least one distribution channel is oriented orthogonally to a central axis of the vertically arranged body.

Fibers from volcanic rocks are becoming increasingly necessary in the composite materials market. Despite their undeniable advantages over fiberglass, the production of fibers from volcanic rocks worldwide is still very small.

However, using volcanic rock (e.g., basalt, basaltic andesite, gabbro, andesite, etc.) presents additional manufacturing challenges not faced by fiberglass. For one, molten volcanic rock melts are opaque, typically owing to the high content of iron oxides, which extremely increases the rate of absorption of infrared radiation. This high absorption rate makes conventional furnaces adapted to deal with volcanic rock melt (i.e., basalt furnaces) have shallow heat penetration and therefore very low productivity. Unlike fiberglass, where heat introduced to the system is able to be relatively evenly spread, as the material is transparent or translucent, the opacity of materials such as basalt requires very little material be processed in a single furnace in order to maintain even temperatures across the melt.

To increase productivity, many manufacturers have installed "tank type" furnaces, attached to long forehearths and a plurality of bushings through which fibers are able to be pulled. In these furnaces, the furnace, forehearth, and working section of the melter are in a common horizontal plane arrangement, typically in a T-shape or an H-shape, such that the melt depth level is common to each component of the melt arrangement. Therefore, by extending the length of the forehearth, the total volume in the system is increased while keeping the depth of the melt low at all positions to permit more uniform heating. Therefore, the arrangement allows for relatively stable fiber making process, but production capacity is still an issue due to shallowness of melter and forehearth. Additionally, this arrangement takes up a large square footage, reducing spatial efficiency of the system greatly. Additionally, due to the longer forehearth, combined conditioning and working sections, more energy (i.e., heat) is required to maintain melt temperature within the required range from entry into the conditioning section toward the ends of working sections. This existing process is summarized very simply as charging the tank melter with raw material, melting the basalt to a homogenous state, molten basalt leaving the melter through a channel passing under a skimmer block into a conditioning section of a forehearth and then into the working section of the forehearth where the basalt is drawn through fiber forming equipment.

Conventional furnace forehearths consist of two sections—a conditioning section and a working section. The conditioning section of the forehearth is designed to cool down the basalt melt and to make melt conform to a laminar flow regime. Laminar flow is an important requirement for reducing fiber breakage rate at the fiber forming devices. The working section of the forehearth distributes laminar melt flow among multiple fiber forming devices. Both the conditioning and the working sections have additional heat sources (i.e., burners) installed to compensate for the drop in melt temperature as the melt passes to the ends of forehearth. Unlike fiberglass furnaces, due to the opacity of volcanic rock melts, forehearths of basalt furnaces are very shallow (the depth of the melt flow is about 50-70 mm), which makes it practically impossible to use electrode heating in the forehearth. Therefore, only natural gas burners are used. However, such burners must be properly controlled to avoid melt breakage in order to prevent an increase in the rate of fiber breakage.

The volcanic rock melt processing steps prior to the fiber formation play a major role in the function of the fiber forming device. Defects in the melt stream caused by faults in the melting process cannot be corrected by the fiber forming device. Temperature variations in the melt, for example, cannot be compensated simply by heating the bushing. Unmolten solid particles of the batch components clog the perforated sheet of the bushing and often act as nuclei for crystallization. In extreme cases, impurities in the melt are even capable of destroying bushings within a few hours.

Figure 1:
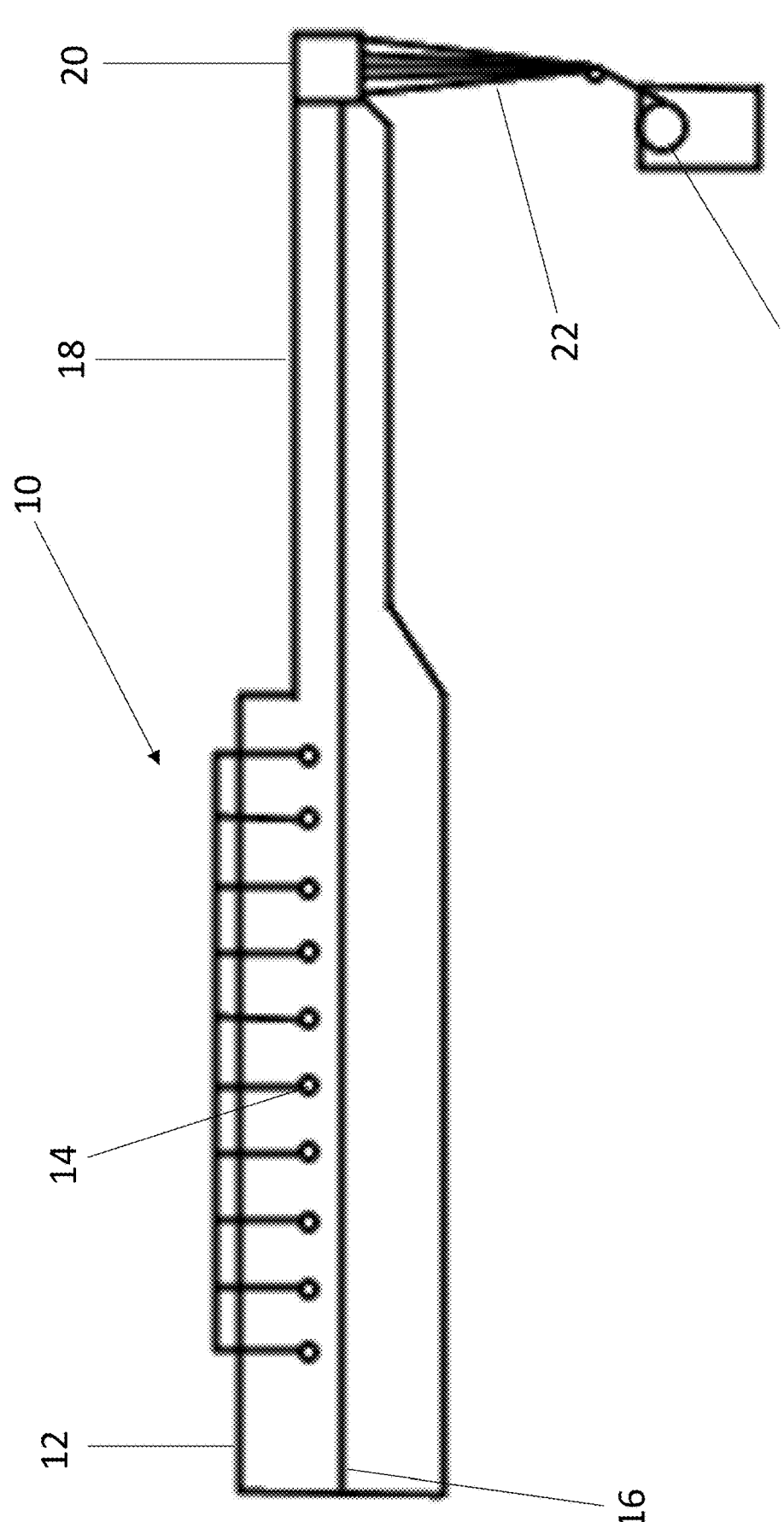
FIG. 1 illustrates a side view diagram of a conventional T-shaped bath furnace.
PRIOR ART
Figure 2:
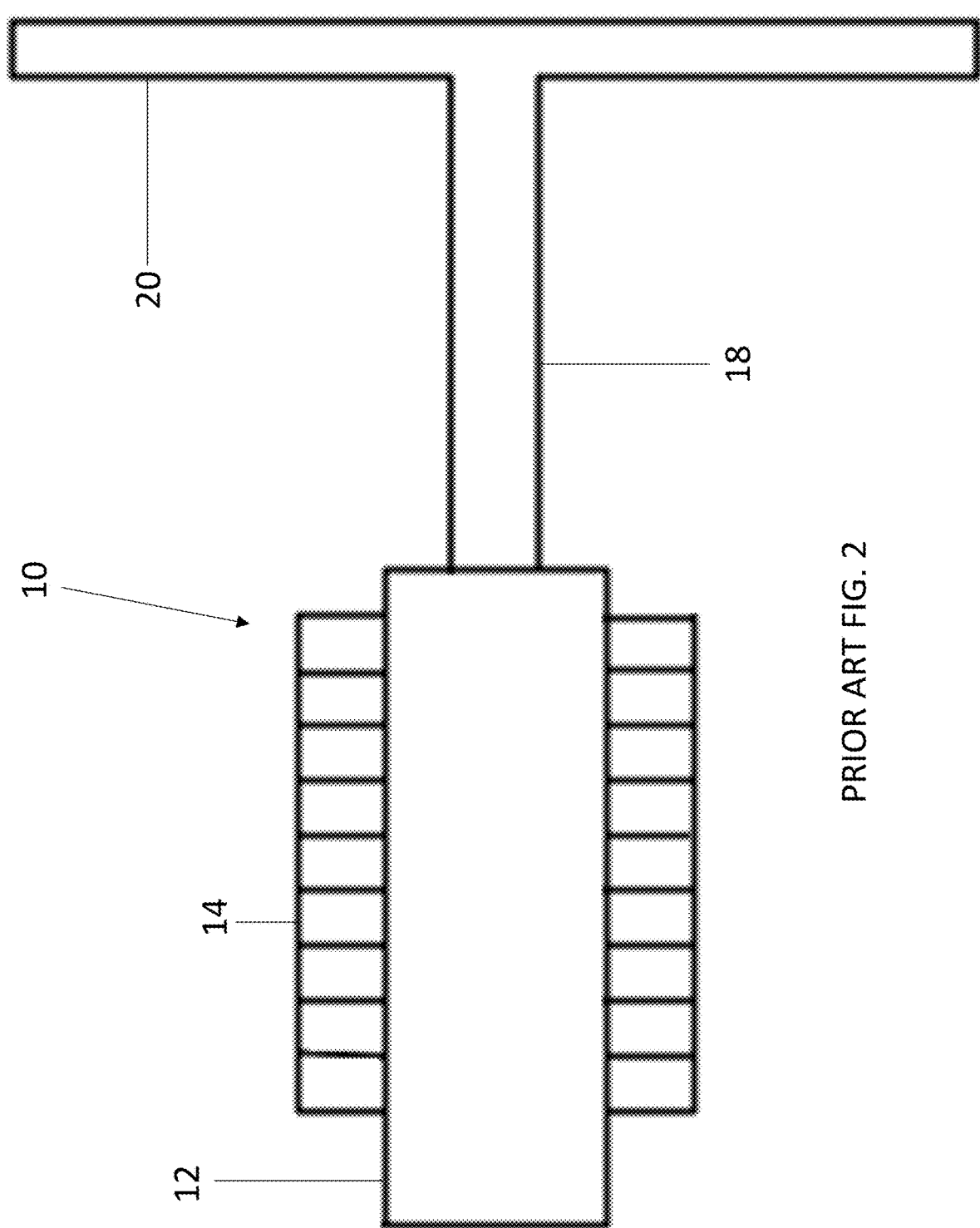
FIG. 2 illustrates a top view diagram of a conventional T-shaped bath furnace.

PRIOR ART FIGS. 1-2 illustrate a conventional T-shaped bath furnace. The bath furnace 10 includes a melting section 12 including a heating elements 14 for increasing the temperature of the melting section 12. These heating elements 14 are commonly gas burners and/or secondary heating electrodes. The solid charge is inserted into the melting section 12 and heated to a temperature greater than the liquidus temperature of the solid charge so as to melt the material. The melt then passes into a conditioning section 18 of the forehearth before entering a working section 20 including one or more bushings through which the melt is drawn into fibers 22. The fibers 22 are then wound on a spool 24. Importantly, the melting section 12 and the conditioning section 18 (and, in some situations the working section 20) all lie within a common horizontal plane and the melt level 16 is therefore common between the melting section 12 and the conditioning section 18. As the melt moves through the conditioning section 18 and the working section 20, heat naturally dissipates from the melt (especially given the low melt depth, meaning there is a high surface area to volume ratio) meaning that gas burners commonly need to be added to these sections in order to maintain sufficiently high temperatures and to maintain temperature homogeneity.

The system shown in FIGS. 1 and 2 is largely inherited from existing systems used for fiberglass melts. Because fiberglass cools much more slowly than basalt or andesite, the long conditioning and working sections are needed in order to ensure that the melt isn't too hot during fiber formation. However, basalt's tendency to cool much quicker than fiberglass means that more than minor details are able to be made to the production, but rather the entire furnace is able to be redesigned.

Existing prior art designs have not been produced that particularly tailor industrial scale volcanic rock fiber production to the particular needs of materials such as basalt and andesite. For example, U.S. Pat. No. 10,696,576 includes a furnace having multiple inductively heated zones, but fails to contemplate the need to accommodate distribution channels with a plurality of bushing plates such that higher volumes of the basalt fiber are able to be achieved with a single melting section. Instead, FIGS. 3A and 3B of the '576 patent contemplate attaching a casting plenum directly to the bottom of the body of the furnace. Furthermore, these same embodiments do not include a cooling section to allow for the creation of a laminar flow regime to reduce likelihood of fiber breakage, leading to inefficiencies or even inoperability of the described invention. Furthermore, there is no method to ensure the rock reaches a liquidus state (and in fact, it is extremely unlikely that the rock could reach the liquidus state in FIGS. 3A and 3B barring an extremely slow, inefficient flow rate). Given the high likelihood that unmolten particles quickly reach the plenum surface in this embodiment, the system is likely to break down very quickly. Other embodiments, such as that shown in FIG. 2 requires the use of a channel extending horizontally between two separate containers, with no assurance that the melt will be in a liquidus state when it enters the channel (potentially blocking the channel). This also means that how long the melt needs to stay in the channel in the embodiment in FIG. 2 of the '576 patent is highly dependent on the melting temperature in the initial melter.

Similarly, U.S. Pat. No. 9,771,294, as exemplified by FIG. 2, directly connects the fiber forming component to the melting section and based on the design, there is no assurance that the material is fully melted by the time it enters the fiber forming region, likely damaging the equipment and increasingly likely of fiber breakage. The FIG. 2 of the '294 patent also does not include the use of a distinct cooling section, nor a second induction coil used to maintain the temperature of the melt. FIG. 4 of the '294 patent does appear to show the melt being transported to a forehearth including a plurality of bushings, but still fails to include any method of ensuring the material enters the forehearth at the right temperature.

The inclusion of the underflow baffle in U.S. Pat. No. 10,858,275 is likely to improve melt quality entering the conditioning section of the furnace relative to the aforementioned discussed system, but the '275 patent relies on a horizontal orientation of the furnace, creating the issues with maintaining temperature of the melt (and requiring large energy usage to power additional heating devices as previously mentioned) and the large form factor mentioned with respect to traditional bath furnaces.

Referring now to the drawings in general, the illustrations are for the purpose of describing one or more preferred embodiments of the invention and are not intended to limit the invention thereto.

FIGS. 3-4 illustrate a cold crucible induction furnace according to one embodiment of the present invention. Raw solid rock material (i.e., the charge) is added into the main melting body 102 of the furnace 100. The main melting body 102 includes one or more first induction coils 110 wrapped around a first end of the main melting body 102. The one or more first induction coils 110 are configured to heat the raw solid rock material to approximately a first temperature. In one embodiment, the first temperature is greater than or equal to 100° C. hotter than the liquidus temperature of the raw solid rock materials. In one embodiment, the first temperature is less than or equal to approximately 3000° C., such that all crystalline inclusion the rock melt are also melted. After being melted, a second temperature is maintained for the melt by one or more second induction coils 114 wrapped around a second end of the main melting body 102. In one embodiment, the second temperature is greater than the crystallization temperature of the melted material, but lower than the first temperature.

After exiting the main melting body 102, the melt enters one or more distribution channels 118 oriented orthogonally to a central axis of the main melting body 102 (i.e., horizontal relative to the vertical furnace 100) and is extruded through a plurality of channels in one or more bushing plates 120 such that the melt is drawn into fibers 122. As shown from FIG. 4, compared to PRIOR ART FIG. 2, the furnace 100 of the present invention shows a greatly reduced spatial footprint relative to prior art furnaces. The fibers 122 are then wound on a spool 124. In one embodiment, the fibers 122 are sprayed with water or another fluid in order to cool the fibers 122 before they are wound. However, as volcanic rock such as basalt tends to cool far quicker than fiberglass, the fiber cooling step is frequently not necessary.

Importantly, the vertical orientation of the main melting body 102 means that hydraulic pressure is automatically applied to the melt due to the weight of the above melt. This means that the one or more distribution channels 118 are able to be fully horizontal, rather than angled so as to utilize gravity to flow through the channels. This is important, as horizontal furnaces commonly require a slight angle to the distribution channels (e.g., approximately 5 degrees) as they are incapable of generating sufficient pressure to move the melt to the bushing plates in sufficient time without angling. However, manufacturing the distribution channels at a slight angle, especially given that these distribution channels are often quite long (i.e., 20 feet or more) is often difficult and time consuming. Furthermore, as the melt is formed, it completely fills the main melting body 102 and the distribution channels 118 of the device. Compared to traditional horizontal systems, this means that far less air is in contact with the melt as it passes through the furnace, leading to decreased melt oxidization.

FIG. 5 illustrates a side sectional view diagram of a vertical furnace according to the present invention. As shown in FIG. 5, the charge enters an opening 103 in the top of the main melting body 102 of the furnace 100. The top of the main melting body 102 is a first zone, characterized as the melting zone of the main melting body 102. The melting zone is surrounded by the one or more first induction coils 110 in order to increase the temperature of the charge above the liquidus temperature of the charge (and/or any crystalline inclusions in the charge) and thereby melt the charge. In one embodiment, the first temperature is greater than or equal to 100° C. hotter than the liquidus temperature of the raw solid rock materials. In one embodiment, the first temperature is less than or equal to approximately 3000° C., such that all crystalline inclusion the rock melt are also melted. Furthermore, the power and/or frequency used to drive the one or more first induction coils 114 is chosen so as to provide appropriate electromagnetic stirring of the melt. Crucially, the use of induction heating allows the charge to be heated to temperatures far beyond the liquidus temperature to ensure the rock is fully melted, allowing for greater control and heat relative to gas burning furnaces.

The melting zone includes a baffle system including baffles 107, 108 preventing solid, unmelted material (e.g., raw crushed rock) from entering the lower portions of the furnace 100. In one embodiment, at least one temperature sensor 104 (e.g., a thermocouple) detects the temperature of the melt overflow exiting the melting zone. If the temperature of the melt overflow if below a preset temperature threshold, then the melt overflow zone is automatically blocked, preventing the melt from entering the second zone. In one embodiment, the melt overflow zone is blocked by pivoting at least one door flap to block the area of the flow into the second zone. Therefore, the use of the at least one temperature sensor 104 helps prevent solid material from exiting the melting section. In one embodiment, the at least one temperature sensor includes at least one pyrometer. In one embodiment, the melting section includes a top opening 106 above the melt overflow zone allowing for gas and/or foam to be released during the melting process to prevent pressure build up. In one embodiment, at least one suction pump is attached to the top opening 106 in order to force gas and/or foam out of the system. The at least one suction pump is operable to generate either negative or positive pressures sufficient to drive the gas and/or foam out of the system. In one embodiment, the at least one temperature sensor 104 measures the temperature of the melt overflow through the top opening 106. In one embodiment, the melt flow rate is chosen such that approximately 15 minutes elapse between when the charge is loaded into the melting section and when the melted charge enters the second zone, ensuring the charge appropriately fully melts. In one embodiment, the melt flow rate is controlled by adjusting the diameter-height ratio of the channels within the melting section.

In one embodiment, the external shell of the main melting body 102 includes one or more water jackets for cooling the side walls of the furnace. Water jackets are useful in the furnace both for regulating the temperature of the melt, and for ensuring that the melting body 102 itself does not melt due to the immense heat of the molten rock. In one embodiment, the external shells of the melting section, the cooling section, and the conditioning section each have their own, independent water jackets, such that the temperature and/or water flow to each section is able to be independently modulated. For example, in one embodiment, a water jacket 111 surrounding the melting section is connected to a first water circulation system, a water jacket 113 surrounding the cooling section is connected to a second water circulation system, and a water jacket 115 surrounding the conditioning section is connected to a third water circulation system. Additionally, in one embodiment, external walls of the distribution channels also include at least one water jacket, independently fed and regulated from any of the water jackets of the main melting body 102.

After the melt overflows around the baffle 107 and is gravity-fed into the second zone (i.e., the cooling section) of the main melting body 102, the temperature gradually reduces as the melt is no longer surrounded by the heating induction coils. Additionally, in one embodiment, the exterior shell of the main melting body 102 in the cooling section includes an external water jacket 113. In one embodiment, the external water jacket 113 is made from copper and/or stainless-steel. In one embodiment, the external water jacket 113 is connected to at least one external water cooling system operable to continuously pump cold water into the external water jacket so as to cool the melt in the cooling section. In one embodiment, one or more internal cooling systems 112 are positioned within the interior of the cooling section. In one embodiment, the one or more internal cooling systems 112 include one or more internal water jackets. In one embodiment, the one or more internal water jackets 112 are formed from copper and/or stainless steel. In one embodiment, the one or more internal water jackets 112 are connected to at least one external water cooling system operable to continuously pump cold water into the one or more internal water jackets 112 so as to cool the melt in the cooling section. In one embodiment, the at least one external water cooling system for the one or more internal water jackets 112 is independent of the at least one external water cooling system for the exterior shell 113 of the cooling section. In one embodiment, the melt in the cooling section reduces temperature, but is still at least 100 degrees greater than the crystallization temperature for the melt. In one embodiment, the melting in the cooling section reduces temperature to approximately 100 degrees greater than the crystallization temperature for the melt.

Gravity feeds the melt from the cooling section into the third zone (e.g., the conditioning section) of the main melting body 102. In one embodiment, the conditioning section is surrounded by the one or more second induction coils 114. The one or more second induction coils 114 serve to maintain the temperature of the melt above a crystallization temperature of the charge to ensure the melt does not begin to crystallize before it enters the distribution channels 118 or while in the distribution channels 118. Furthermore, the conditioning section is important in ensuring that the melt appropriately remains in the laminar regime as it passes through the distribution channels 118. The power and/or frequency used to drive the one or more first induction coils 110 and/or the one or more second induction coils 114 is chosen such that appropriate melting of the charge occurs in the melting section and such that the temperature of the melt is above the desired level in the conditioning section. Furthermore, the power and/or frequency used to drive the one or more second induction coils 114 is chosen so as to provide no electromagnetic stirring of the melt. Because the main melting body 102 itself includes a conditioning section, in one embodiment, the forehearth of the furnace 100 consists of the distribution channels 118 with no additional conditioning section. In one embodiment, the furnace 100 includes at least one secondary temperature sensor 116 positioned at the interface between the conditioning section and the distribution channels 118. In one embodiment, the at least one secondary temperature sensor 116 detects the temperature of the melt exiting the main melting body 102. In one embodiment, data produced by the at least one secondary temperature sensor 116 (e.g., the detected temperature of the melt exiting the conditioning section) automatically adjusts the power and/or frequency used to drive the one or more first induction coils 110 and/or the one or more second induction coils 114. In one embodiment, data produced by the at least one secondary temperature sensor 116 automatically adjusts the flow rate of water into the external water jackets and/or the internal water jackets of the cooling section, thereby affecting the rate at which temperature decreases in the cooling section. The distribution channels 118 transport the melt to one or more bushing plates 120, where the melt is extruded into fibers through a plurality of pores in the one or more bushing plates 120.

In one embodiment, the frequency used to drive the one or more second induction coils 114 is substantially greater than the frequency used to drive the one or more first induction coils 110. By way of example and not limitation, in one embodiment, the frequency used to drive the one or more first induction coils is approximately 300 MHz, while the frequency used to drive the one or more second induction coils is approximately 1 GHz. In one embodiment, the power used to drive the one or more first induction coils 110 is substantially greater than the power used to drive the one or more second induction coils 114. By using higher power and lower frequency in the first zone, the inductive heating is able to penetrate more deeply into the charge and more vigorous stir to allow for a rapid increase in temperature. However, the turbulence caused by such a high power used in the top section is not preferable in the third zone, as it would cause unevenness and thus poorer product as the melt enters the distribution channels. In fact, in one embodiment, the melt in the third zone only exhibits approximately 20% of the stirring intensity of the first zone. Instead, using high frequency causes the inductive heating effect to larger heat the outer sections of the melt (i.e., those sections closer to the wall). While such heating would not be preferable in the first zone, by the time the melt is in the third zone, it is already hot and thermally conductive enough such that the heat more easily transfers, e.g., via convection, through the entire melt. In one embodiment, the first zone and/or the third zone includes one or more heat flux concentrators, which act like thermal reflectors and allow power to be reflected internally within the chamber to increase the degree of heat applied to the whole melt.

In one embodiment, the induction coils of the present invention are connected to the one or more temperature sensors in a temperature feedback circuit. One of ordinary skill in the art will appreciate that any number of the induction coils of the present invention are operable to be connected to any number of the temperature sensors of the present invention in order to control the temperature of the induction coil in response to a detected temperature of the melted igneous rock material. In one embodiment, the water jackets of the present invention are connected to the one or more temperature sensors in a temperature feedback circuit. One of ordinary skill in the art will appreciate that any number of the water cooling systems of the present invention are operable to be connected to any number of the temperature sensors of the present invention in order to control the flow rate of the water in response to a detected temperature of the melted igneous rock material.

FIG. 6 illustrates a perspective view of an induction furnace according to one embodiment of the present invention. As shown in FIG. 6, a large opening 103 in the top of the melting section of the main melting body 102 allows for the pouring of a raw igneous rock material charge into the melting section, while one or more induction coils 110 wrapped around the melting section provide for heating. A smaller, top opening 106 in the top of the melting section provides for gas release. The cooling section is not wrapped with induction coils, while the bottom conditioning section is wrapped with one or more induction coils 114 to ensure that the melt is not too cool when it enters the distribution channels.

FIG. 7 illustrates an exploded view of the induction furnace of FIG. 6. FIG. 7 shows that the melting section 130, cooling section 132, and conditioning section 134 of the main melting body 102 are distinct parts of the main melting body 102 that are able to be manufactured separately. In one embodiment, the melting section 130, the cooling section 132, and/or the conditioning section 134 are connected via welding, bolts, screws, nails, latches, and/or any other conventional means of attachment. However, connection via welding is preferred due to the strong, leak-tight connection formed between components. FIG. 7 also shows the internal cooling system 112 of the cooling section 132 of the main melting body 102, including at least one connection rod 140 extending between the exterior shell of the cooling section 132 and the internal cooling system 112. In one embodiment, the at least one connection rod 140 serves to attach the internal cooling system 112 to the rest of the cooling section 132 and/or serves as a water supply line for cooling the internal cooling system 112.

In one embodiment of the present invention, a cooling section 132 is not included, such that the melt exits from the melting section 130 and immediately enters the conditioning section 134. This is useful where the temperature does not need to be substantially reduced (or perhaps reduced to a lesser degree), but the degree of turbulence of the melt does need to be reduced, which is able to happen in the conditioning section 134.

As shown in FIG. 8, the one or more induction coils 110 wrapped around the melting section are attached to at least one electrical lead 142, which provides current to activate the one or more induction coils 110. Similarly, the one or more induction coils 114 wrapped around the conditioning section are attached to at least one electrical lead 144, which provides current to activate the one or more induction coils 114 independently of any current supplied to the one or more induction coils 110 wrapped around the melting section.

FIG. 9 illustrates a perspective sectional view of a melting section of an induction furnace according to one embodiment of the present invention. FIG. 9 provides a zoomed-in view of the baffle system and baffles 107, 108 used to prevent unmelted or partially melted charge from entering the cooling section. Notably, in the embodiment of FIG. 9, the gas release opening, also referred to herein as the top opening 106, is positioned approximately above a section of the baffle system, baffle 107 extending upwardly from the bottom of the melting section 130. Furthermore, the bottom of the melting section 130 includes an opening 150, opposite the side of the melting section 130 that includes the opening 103 to receive the charge. The opening 150 allows the fully melted material to flow into the cooling section after it spills over the baffle 107.

FIG. 10 illustrates an induction furnace including a forehearth and bushing plates according to one embodiment of the present invention. The forehearth 152 of the furnace 100, including one or more distribution channels, is attached to the bottom of the main melting body 102. One or more bushing plates 154 extend outwardly from the distribution channels of the forehearth 152 and allow for the extrusion of individual igneous rock fibers. In one embodiment, sections of the forehearth 152 between each bushing plate 154 are wrapped with one or more induction coils 156, allowing the melt to maintain sufficient heat even as it flows through a potentially very long forehearth 152. One of ordinary skill in the art will understand that, while FIG. 10 depicts two distribution channels extending in opposite directions and each including two bushing plates 154, embodiments of the present invention are able to be used that include any number of distribution channels, in any relative orientation, and with each distribution channel including any number (e.g., 1, 5, 10, etc.) of bushing plates 154.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A furnace for melting igneous rock material, comprising:

a central melting body having a melting zone oriented vertically above a cooling zone, which is oriented vertically above a conditioning zone;

at least one distribution channel extending outwardly from the conditioning zone of the central melting body; and at least one temperature sensor positioned in a bottom of the central melting body;

wherein the melting zone of the central melting body is surrounded by at least one melting zone induction coil;

wherein the at least one melting zone induction coil is operable to melt an igneous rock charge within the melting zone;

wherein the conditioning zone is surrounded by at least one conditioning zone induction coil;

wherein the at least one conditioning zone induction coil operates at a greater frequency than the at least one melting zone induction coil;

wherein the at least one temperature sensor is configured to detect a temperature of melted igneous rock exiting the conditioning zone and entering the at least one distribution channel;

wherein the cooling zone includes an internal water-cooling jacket; and wherein a frequency and/or power used to operate the at least one melting zone induction coil and/or at least one conditioning zone induction coil are altered by a controller based on sensor data from the at least one temperature sensor.

2. The furnace of claim 1, wherein the melting zone includes a gas release opening and a charge insertion opening, wherein the charge insertion opening is configured to receive the igneous rock charge and the gas release opening is configured to release gas and/or foam generated by melting the igneous rock charge.

3. The furnace of claim 2, wherein at least one suction pump is attached to the gas release opening and generates pressures operable to force gas and/or foam out of the central melting body.

4. The furnace of claim 1, wherein the at least one melting zone induction coil is configured to increase the temperature of the igneous rock charge above the liquidus temperature of the igneous rock charge.

5. The furnace of claim 1, wherein the melting zone includes one or more baffles.

6. The furnace of claim 1, wherein the cooling zone is not inductively heated.

7. The furnace of claim 1, wherein the at least one distribution channel extends orthogonally outwardly relative to a central axis of the central melting body.

8. The furnace of claim 1, wherein the at least one distribution channel is surrounded by at least one distribution channel induction coil, operable to maintain a temperature of the melted igneous rock as it moves through the at least one distribution channel.

9. The furnace of claim 1, wherein the melting zone and the conditioning zone are configured such that the melted igneous rock moves out of the melting zone and into the conditioning zone due to gravitational forces.

10. A method for manufacturing igneous rock fibers, comprising:

inserting an igneous rock charge into a melting zone of a furnace, the furnace comprising a central melting body having the melting zone oriented vertically above a cooling zone, which is oriented vertically above a conditioning zone, wherein the melting zone is surrounded by at least one melting zone induction coil;

the at least one melting zone induction coil, operating at a first frequency, melting the igneous rock charge in the melting zone;

cooling the melted igneous rock in the cooling zone using an internal water-cooling jacket;

the melted igneous rock flowing into the conditioning zone of the furnace due to gravitational force, wherein the conditioning zone is surrounded by at least one conditioning zone induction coil;

the at least one conditioning zone induction coil, operating at a second frequency, maintaining the melted igneous rock at approximately a preset temperature in the conditioning zone;

the melted igneous rock flowing into at least one distribution channel;

detecting, via at least one temperature sensor positioned in a bottom of the central melting body, a temperature of the melted igneous rock exiting the conditioning zone and entering the at least one distribution channel;

altering, by a controller, a frequency and/or power used to operate the at least one melting zone induction coil and/or the at least one conditioning zone induction coil based on sensor data from the at least one temperature sensor; and a bushing plate, attached to the at least one distribution channel, extruding the melted igneous rock through a plurality of pores to create a plurality of charge fibers;

wherein the first frequency is less than the second frequency.

11. The method of claim 10, further comprising heating the igneous rock charge in the melting zone of the furnace to a first temperature, wherein the first temperature is detected by a melting zone temperature sensor.

12. The method of claim 11, further comprising at least one door flap automatically blocking a melt overflow channel of the melting zone based on sensor data from the melting zone temperature sensor detecting that the first temperature of the melted igneous rock is below a preset threshold, wherein blocking the melt overflow channel prevents the melted igneous rock from flowing out of the melting zone.

13. A furnace for melting igneous rock material, comprising:

a central melting body having a melting zone oriented vertically above a cooling zone, which is oriented vertically above a conditioning zone;

at least one melting zone induction coil surrounding the melting zone of the central melting body, operable to melt an igneous rock charge deposited in the melting zone;

at least one conditioning zone induction coil surrounding the conditioning zone of the central melting body;

at least one distribution channel extending outwardly from the conditioning zone of the central melting body;

at least one bushing plate connected to the at least one distribution channel;

at least one temperature sensor positioned in a bottom of the central melting body;

a first temperature sensor positioned within a melt overflow channel of the melting zone, wherein the first temperature sensor is operable to detect a temperature of melted igneous rock in the melting zone; and a second temperature sensor positioned between the conditioning zone and the at least one distribution channel;

wherein the cooling zone includes an internal water-cooling jacket; and wherein the at least one distribution channel is oriented orthogonally to a central axis of the vertically arranged central melting body.

14. The furnace of claim 13, wherein the melting zone further includes a first external water jacket, wherein the cooling zone further includes a second external water jacket, wherein the conditioning zone further includes a third external water jacket.

15. The furnace of claim 13, wherein the at least one conditioning zone induction coil operates at a frequency greater than the at least one melting zone induction coil.

16. The furnace of claim 15, wherein the at least one conditioning zone induction coil operates at a frequency of approximately 1 GHz, and wherein the at least one melting zone induction coil operates at a frequency of approximately 300 MHz.

* * * * *